United States Patent
Tanno et al.

(10) Patent No.: US 6,950,455 B2
(45) Date of Patent: Sep. 27, 2005

(54) SYNCHRONIZATION ESTABLISHING METHOD OF MOBILE STATION IN MOBILE COMMUNICATION SYSTEM

(75) Inventors: Motohiro Tanno, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 686 days.

(21) Appl. No.: 09/880,453

(22) Filed: Jun. 13, 2001

(65) Prior Publication Data

US 2001/0053191 A1 Dec. 20, 2001

(30) Foreign Application Priority Data

Jun. 14, 2000 (JP) ........................................ 2000-178747

(51) Int. Cl.[7] .............................................. H04L 27/30
(52) U.S. Cl. ........................ 375/142; 375/150; 375/367; 370/510
(58) Field of Search ................................ 375/142, 150, 375/362, 365, 367, 354, 343; 370/508, 509, 510, 516, 503, 506

(56) References Cited

U.S. PATENT DOCUMENTS

| | | | | |
|---|---|---|---|---|
| 5,818,869 A | | 10/1998 | Miya et al. | ................ 375/206 |
| 6,304,619 B1 | * | 10/2001 | Citta et al. | ................ 375/343 |
| 6,751,247 B1 | * | 6/2004 | Zhengdi | .................... 375/130 |
| 6,785,350 B1 | * | 8/2004 | Poulbere et al. | ........... 375/343 |

FOREIGN PATENT DOCUMENTS

| | | | | |
|---|---|---|---|---|
| EP | 0661830 A2 | 12/1994 | .......... | H04B/1/707 |
| EP | 0 963 060 A2 | 8/1999 | .......... | H04B/7/06 |
| EP | 0 996 237 A1 | 4/2000 | .......... | H04B/7/005 |
| EP | 1 109 325 A2 | 6/2001 | .......... | H04B/1/707 |
| EP | 1 130 793 A1 | 9/2001 | .......... | H04B/1/707 |
| GB | 2320402 A | 6/1998 | .......... | H04B/7/216 |
| JP | 07/140224 | 6/1995 | ............ | G01S/5/14 |
| JP | 10-112672 | 4/1998 | .......... | H04B/1/707 |
| JP | 10313267 | 11/1998 | .......... | H04B/1/707 |
| JP | 11-008568 | 1/1999 | .......... | H04B/1/707 |
| WO | WO 99/12295 | 3/1999 | ............ | H04J/13/00 |
| WO | WO 99/20023 | 4/1999 | ........ | H04L/27/233 |
| WO | WO 99/43102 | 8/1999 | .......... | H04B/7/04 |
| WO | WO 99/63677 | 12/1999 | .......... | H04B/1/707 |
| WO | WO 00/11876 | 3/2000 | | |

OTHER PUBLICATIONS

Official Note of Rejection Patent Application No. 2000–178747 Case No.: DCMH120012.

* cited by examiner

*Primary Examiner*—Dac V. Ha
(74) *Attorney, Agent, or Firm*—Workman Nydegger

(57) ABSTRACT

A synchronization establishing method of a mobile station in a mobile communication system is proposed which can reduce the effect of noise or interference, and achieve higher accuracy than conventional method. To enable the mobile station to detect a signal transmitted from a base station, and to establish synchronization to the signal in a mobile communication system in which a synchronization channel is multiplexed periodically into the downlink signal, the mobile station averages, in phase and in complex numbers, correlation values of the synchronization channel over a plurality of periods, followed by detecting the power of them to carrying out peak detection.

25 Claims, 16 Drawing Sheets

SYNCHRONIZATION ESTABLISHING METHOD OF MOBILE STATION IN MOBILE COMMUNICATION SYSTEM

This application claims priority under 35 U.S.C. 119 to Patent Application No. 2000-178747 filed Jun. 14, 2000 in Japan, the content of which is incorporated hereinto by reference.

BACKGROUND OF THE INVENTION

1. Field of the Invention

The present invention relates to a synchronization establishing method of a mobile station in a mobile communication system, and more particularly to a synchronization establishing method of a mobile station in a mobile communication system for carrying out peak detection by averaging the synchronization channel in phase in complex numbers.

2. Description of the Related Art

In a W-CDMA (Wide-band Code Division Multiple Access) scheme, a radio access scheme of a third generation mobile communication system, a synchronization channel (SCH) is multiplexed onto a downlink signal transmitted from a base station to a mobile station to enable the mobile station to carry out synchronization establishment by detecting the downlink signal (see, 3GPP Technical Specification 25.211).

Usually, the SCH is transmitted to the mobile station at a known frequency, in known time slots, in a known code and symbol pattern. To carry out synchronization establishment, that is, the timing detection of the SCH, the mobile station performs correlation detection at the frequency, in the time slots and in the code and symbol pattern, thereby determining the most likely timing as the timing of the SCH.

FIG. 1 is a diagram showing a commonly used power averaging method. In FIG. 1, the reference numeral 201 designates the output from a correlator of a mobile station, that is, correlation values of a synchronization channel transmitted from a base station for initial synchronization. The reference numeral 203 designates an equipment to powerize for calculating a square sum of the correlation values of the synchronization channel; and 205 designates a peak detector for detecting a peak of the correlation values in each period of the synchronization channel.

The SCH is repeatedly transmitted at predetermined intervals (at intervals that will give peak values of the output). It is assumed in the following description that the interval is one slot. Normally, to reduce the effect of noise, interference and received power fluctuations, the mobile station averages the correlation values of the SCH over a plurality of slots. Conventionally, the mobile station carries out the averaging after powerizing the output of the correlator slot by slot (power average).

Thus, commonly used power averaging method carries out averaging of the output of the correlator of the mobile station using an equipment to powerize for converting correlation values of the synchronization channel transmitted from the base station into power dimension for establishing the initial synchronization, and a peak detector for detecting the peak of the correlation values in each period of the synchronization channel.

FIG. 2 shows a structure of the SCH. In one frequency, synchronization channels 103 are assigned periodically to a channel set 101 and are transmitted to the mobile station at known frequency and time slots in known code and symbol pattern. The pilot symbols are also used for measuring received signal power. The reference numeral 111 designates a graph representing correlation outputs of the synchronization channel versus time (timings).

The SCH is transmitted to the mobile station at known frequency and time slots in known code and symbol pattern. In the example of FIG. 2, the SCH is transmitted at every one slot interval. The peak detector 205 of the mobile station detects the timings (peaks) 113 at which the correlation values take a maximum value from the correlation values by the correlator at all possible timings. In the conventional power averaging, the averaging is carried out after powerizing the output of the correlators slot by slot as shown in FIG. 1.

Propagation paths of the mobile communication have interference or noise, and the signal-to-noise (S/N) ratio of the SCH for the mobile station is usually very small. Since the SCH is one of control channels that do not transmit user information, it is preferable that the transmission power and transmission duration of the SCH be as small as possible from the viewpoint of the system capacity. To achieve synchronization establishment at high accuracy in such severe conditions, the averaging period must be lengthened. However, an increasing averaging period will lengthen the time required to carry out the synchronization establishment. As a result, it will provide a problem of increasing the power consumption of the mobile station, and lengthening the time taken by cell switching control (handover) involved in the movement of the mobile station across cells during communication.

In addition, mobile communication systems sometimes employ time switched transmit diversity (TSTD) that installs two antennas on a base station and transmits the signal alternately in a prescribed pattern at every predetermined interval to reduce the effect of received level fluctuations due to fading. For example, to apply the TSTD to the SCH, the base station can transmit the SCH alternately in a prescribed pattern at every slot interval from the two antennas (see, 3GPP Technical Specification 25.211). In this case, since the phases of the signals transmitted from the two antennas usually differ from each other, it is difficult to average them in phase.

SUMMARY OF THE INVENTION

The present invention is implemented to solve these problems. Therefore, an object of the present invention is to provide a synchronization establishing method of a mobile station in a mobile communication system that can achieve synchronization establishment at higher accuracy by reducing the effect of noise or interference by averaging the SCH in phase, and that can reduce the time period taken to carry out the synchronization establishment.

To accomplish the object, according to one aspect of the present invention, there is provided a synchronization establishing method of a mobile station in a mobile communication system, in which a synchronization channel is periodically sent in a downlink signal so that the mobile station, which detects the downlink signal sent from a base station, can establish synchronization to the downlink signal, the synchronization establishing method comprising: an averaging step of averaging first correlation values in phase in complex number over a plurality of periods of the synchronization channel, and of outputting first averaged correlation values; a powerizing step of powerizing the first averaged correlation values individually, and of outputting a first powerized correlation values; and a peak detecting step of detecting a peak of the first powerized correlation values output.

Here, the averaging step may average the first correlation values within an averaging window over a plurality of periods of the synchronization channel.

The synchronization establishing method may further comprise a step of averaging the first powerized correlation values, and of outputting first power averaged correlation values, wherein the peak detecting step may detect a peak of the first power averaged correlation values.

The number of periods of the first correlation values, over which the averaging is carried out in the averaging window, may be equal to a moving unit of the averaging window.

The averaging step may assign weights at every period of the first correlation values in the averaging window.

The averaging step may carry out averaging using an exponential weighting averaging method.

The averaging step may make phase correction of one of the first correlation values by using the first correlation values in a period previous to the period of the one of the first correlation values.

The averaging step may assign weights to every period of the first correlation values to which the phase correction is applied.

The powerizing step may output real parts of the first correlation values to which the phase correction is applied.

When the synchronization channel is estimated to be transmitted alternately from two antennas, the averaging step may average second correlation values that are estimated to be transmitted from a same antenna, and output second averaged correlation values; and the powerizing step may detect power of the second averaged correlation values to output second powerized correlation values.

The averaging step may average the first correlation values and the second correlation values separately, and the powerizing step may detect power of the first averaged correlation values and power of the second averaged correlation values, and select one of two sets of the first powerized correlation values and the second powerized correlation values.

The averaging step may average the first correlation values and the second correlation values separately, and the powerizing step may detect power of the first averaged correlation values and power of the second averaged correlation values, and assign weights to the first powerized correlation values and the second powerized correlation values at individual timings, followed by summing them up, respectively. The powerizing step may assign weights to a maximum value of the first powerized correlation values and to a maximum of the second powerized correlation values, and select the powerized correlation values that will give a greater maximum value.

The powerizing step may select one of two sets of the first powerized correlation values and the second powerized correlation values such that the selected one differs from the powerized correlation values selected previously.

The powerizing step may make a decision as to which one of two sets of the first powerized correlation values and the second powerized correlation values is to be selected in accordance with a number of times the two sets of the powerized correlation values are selected.

The powerizing step may successively select one of two sets of the first powerized correlation values and the second powerized correlation values by a predetermined number of times, and when synchronization is not established, it may select the other set of the powerized correlation values.

The synchronization establishing method may further comprise a step of selecting the correlation values to be averaged, wherein the averaging step may average one of two sets of the first correlation values and the second correlation values selected.

The step of selecting may calculate correlation between correlation values in a given period to be averaged and correlation values in a period adjacent to the given period.

The step of selecting may select the correlation values to be averaged in response to a control signal transmitted from the base station.

The averaging step may carry out the averaging over a plurality of first averaging periods that are different from each other, and the powerizing step may assign weights to the plurality of powerized correlation values at individual timings, followed by summing them up.

The averaging step may carry out the averaging over a plurality of first averaging periods that are different from each other, and the powerizing step may select a maximum value from the plurality of powerized correlation values.

The averaging step may carry out the averaging over a second averaging period that adaptively varies.

The second averaging period may be varied in response to a moving speed of the mobile station.

The averaging step may carry out the averaging over a third averaging period that is varied depending on a state of the mobile station, which includes a power up state, an idle state and a traffic state of the mobile station.

The synchronization establishing method may further comprise a step of outputting, when the mobile station is at power up, second power averaged correlation values by detecting powers of the correlation values of the synchronization channel first, and by averaging the powers thereafter, wherein the peak detecting step may detect a peak of the second power averaged correlation values.

The averaging step may carry out the averaging over a fourth averaging period that varies depending on the idle state and the traffic state of the mobile station.

The synchronization establishing method may further comprise a step of outputting, when the mobile station is in one of the power up and idle state, third power averaged correlation values by detecting powers of the correlation values of the synchronization channel first, and by averaging the powers thereafter, wherein the peak detecting step may detect a peak of the third power averaged correlation values.

According to the present invention, the correlation values calculated at respective periods are averaged in phase in complex numbers, followed by power detection. After the power detection, the peak detection is carried out. When the TSTD (Time Switched Transmit Diversity) is applied to the synchronization channel or applicable thereto by setting, a configuration that will bring about most effective in-phase averaging is taken. In addition, in response to the state of the mobile station in the mobile communication system, that is, the power up state, idle state and traffic state, an appropriate synchronization establishing method is selected to carry out effective synchronization establishing operation. This makes it possible to save the time taken to carry out synchronization establishment, and to improve the detection accuracy.

According to the present invention, the output of the correlator of the mobile station that receives the synchronization channel undergoes in-phase averaging. This makes it possible to implement higher averaging effect against the noise or interference than the conventional power averaging, thereby increasing the detection probability of the correlation detection and reducing time required for the detection. In addition, the transmission power of the synchronization channel of the base station can be reduced with maintaining the detection probability at a fixed value. As a result, the present invention can achieve highly accurate synchronization operation of the mobile station in the mobile communication system with reducing the effect of the noise and interference.

Furthermore, according to the present invention, the in-phase averaging is applicable to any of the following cases: when the base station applies the transmit diversity to the synchronization channel or when it does not; and when it is not known whether the transmit diversity is applied or not as in the case where the application of the transmit diversity is selectable.

Moreover, according to the present invention, more effective in-phase averaging can be implemented by selecting optimum averaging period(s) in response to the moving speed of the mobile station or the like.

Finally, according to the present invention, selecting appropriate averaging method or in-phase averaging period in response to the state of the mobile station such as the power up state, idle state, and traffic state, can increase the accuracy of the synchronization establishment, and reduce the time taken to carry out the synchronization establishment.

The above and other objects, effects, features and advantages of the present invention will become more apparent from the following description of embodiments thereof taken in conjunction with the accompanying drawings.

BRIEF DESCRIPTION OF THE DRAWINGS

FIG. 11 is a diagram showing in-phase averaging utilizing averaging windows in the case where TSTD-ON;

FIG. 13 is a block diagram showing a method of averaging carried out by switching between an averaging circuit assuming TSTD-OFF and an averaging circuit assuming TSTD-ON;

FIG. 14 is a block diagram showing averaging carried out by switching an averaging method after deciding as to whether TSTD-OFF or TSTD-ON;

DETAILED DESCRIPTION OF PREFERRED EMBODIMENTS

The preferred embodiments in accordance with the present invention will now be described with reference to accompanying drawings.

Figure 1:
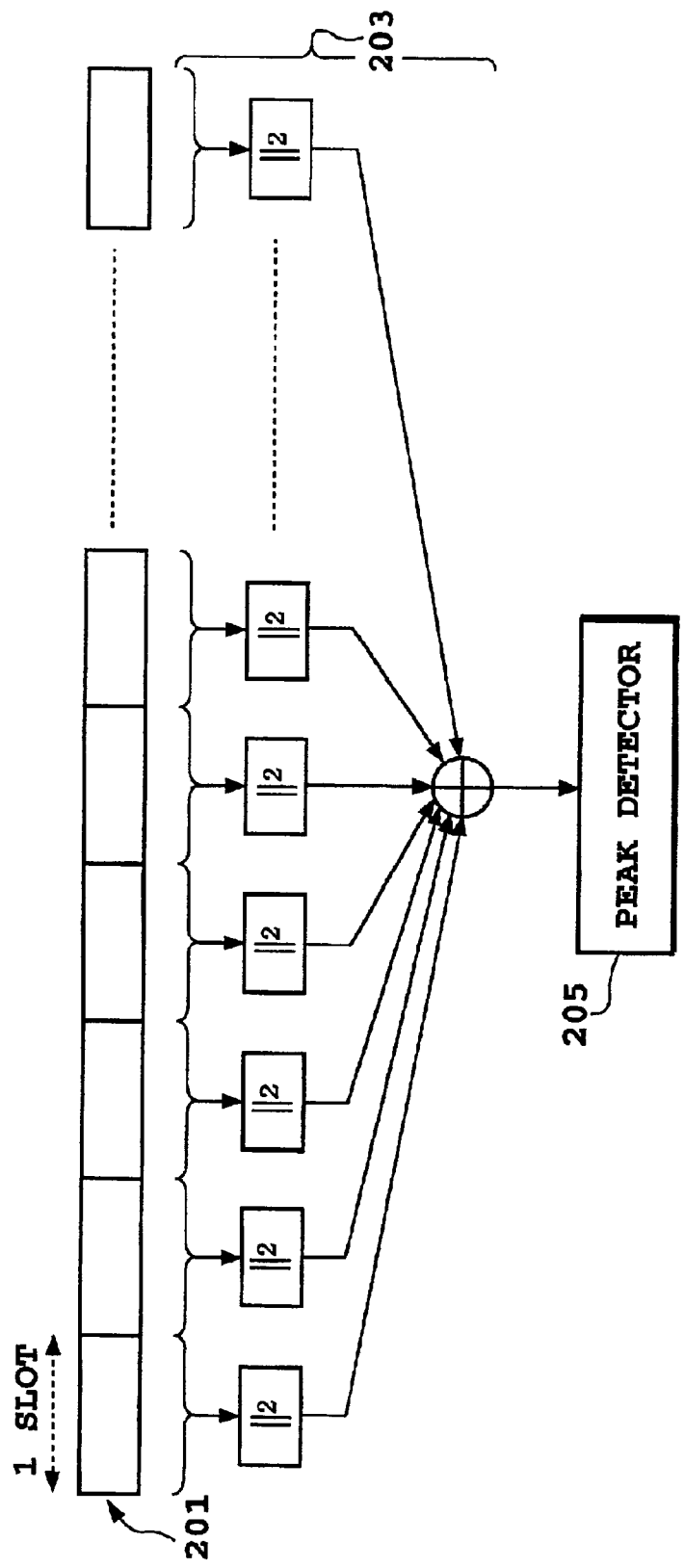
FIG. 1 is a diagram showing a conventional power averaging method.
Figure 2:
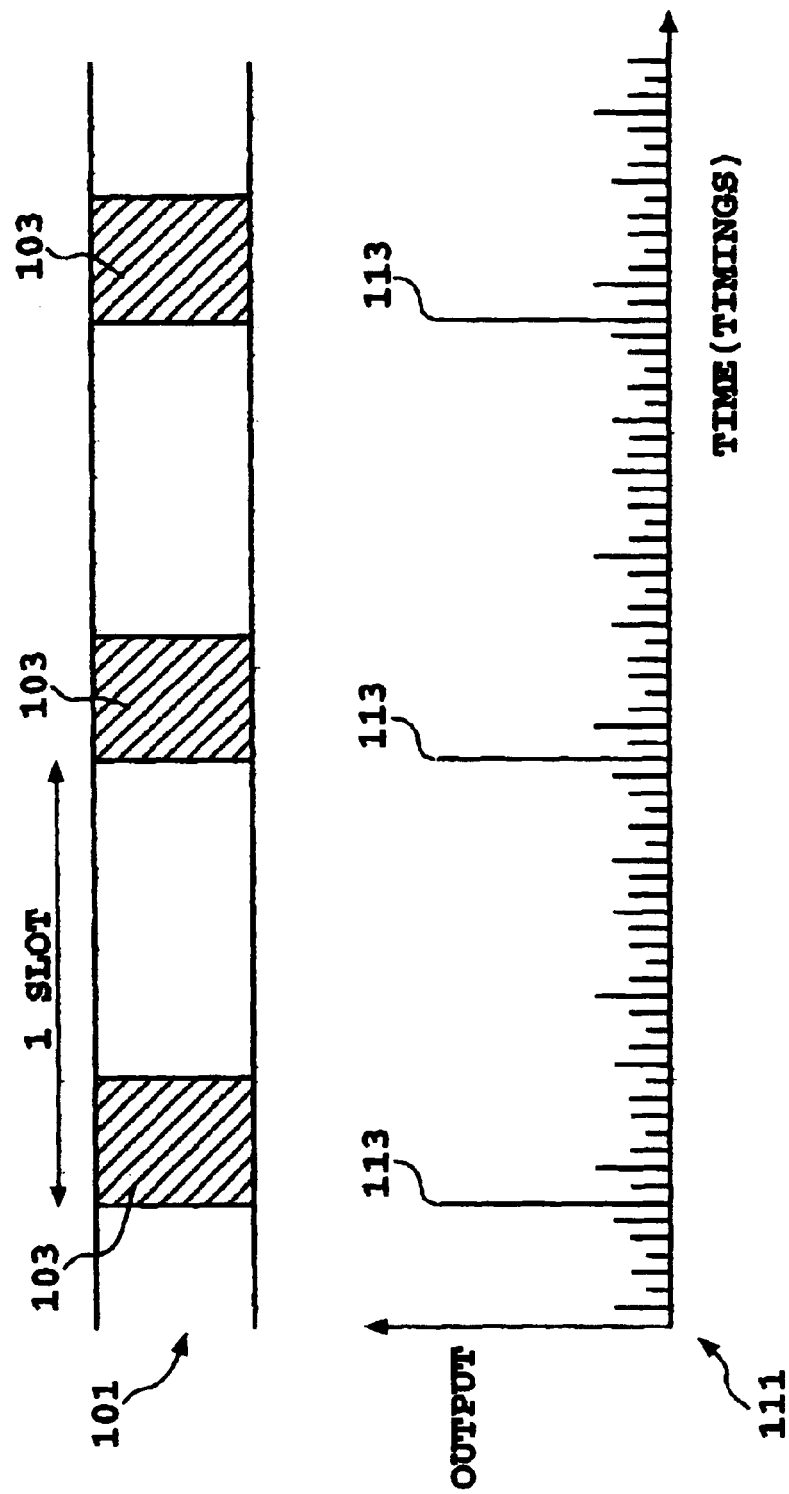
FIG. 2 is a diagram illustrating an example of a common synchronization channel transmission method and the output of a correlator of a mobile station in a mobile communication system.
Figure 3:
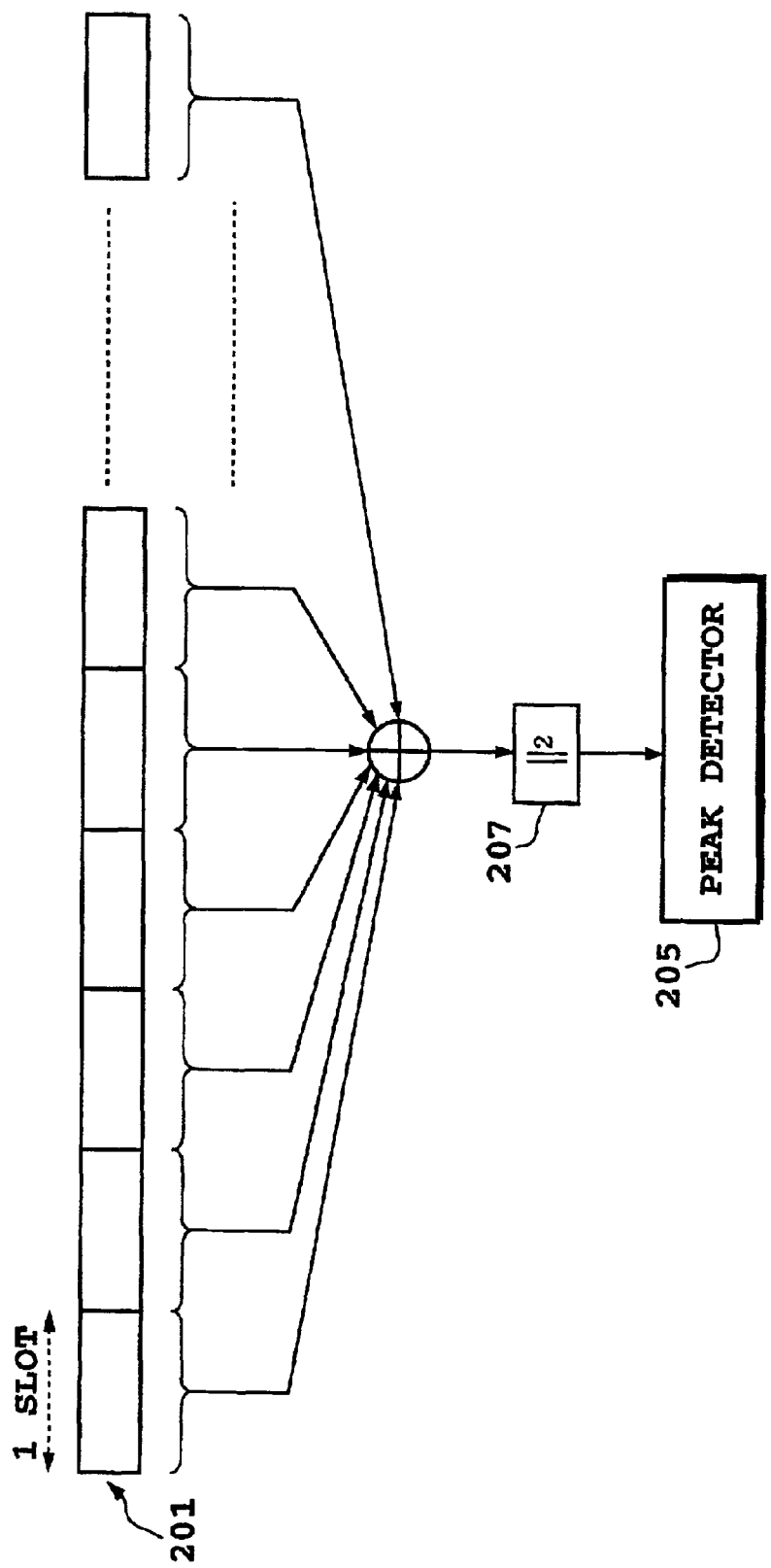
FIG. 3 is a diagram showing an in-phase averaging method of an embodiment in accordance with the present invention.

FIG. 3 shows an in-phase averaging method used for carrying out synchronization establishment in the present embodiment.

In the in-phase averaging, the output of the correlator is averaged in-phase in complex numbers, followed by powerizing the average by a power detector 207. Generally, the in-phase averaging has higher averaging effect against noise and interference than the power averaging.

Figure 4:
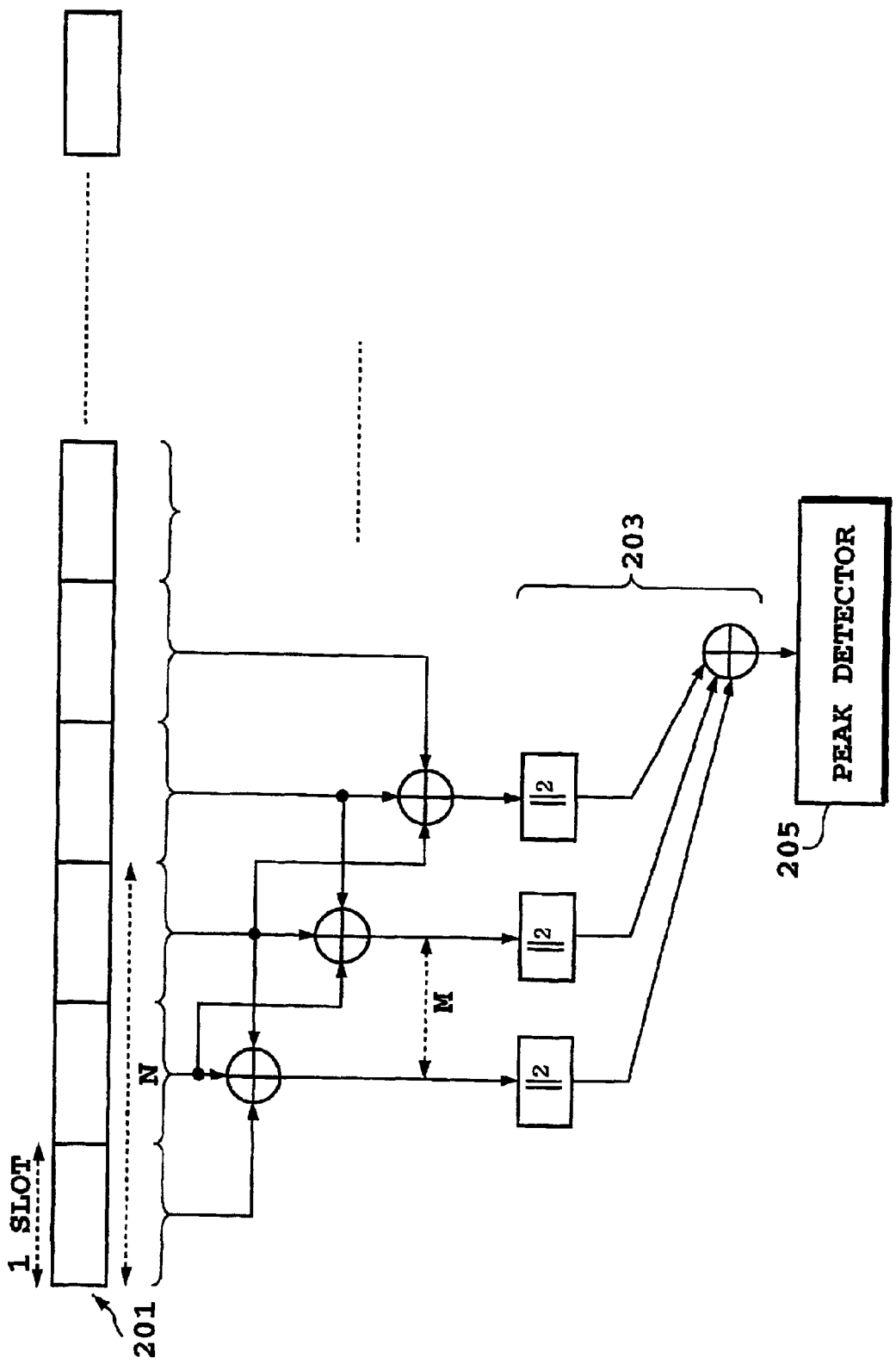
FIG. 4 is a diagram showing in-phase averaging utilizing averaging windows in an embodiment in accordance with the present invention.
Figure 5:
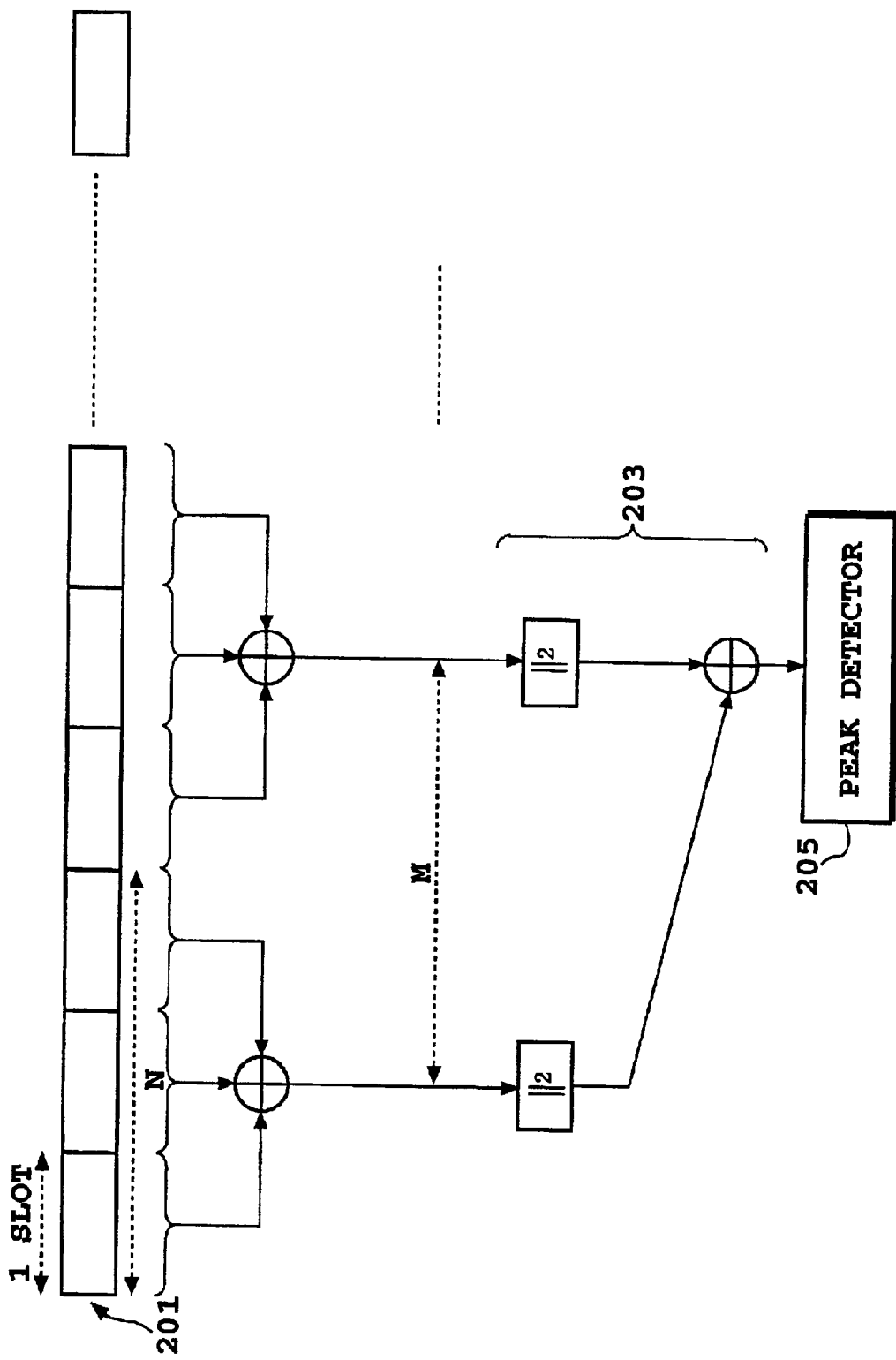
FIG. 5 is a diagram showing the in-phase averaging utilizing averaging windows in an embodiment in accordance with the present invention.

FIGS. 4 and 5 illustrate in-phase averaging utilizing averaging windows. It is usually difficult to estimate the phase of the output of the correlator because of sharp fluctuations in the phase of a signal on a propagation path of the mobile communication. The phase fluctuations, however, are small during an interval short enough as compared with the speed of the phase fluctuations due to fading on the propagation path. Accordingly, in-phase averaging in short intervals will bring about averaging effect higher than the conventional power averaging method. In the example as shown in FIG. 4, the averaging window range N for averaging the correlation values 201 is three slots, and the moving step M of the averaging windows is one slot.

Within the averaging window range, the output of the correlator is averaged in phase in complex number. After that, to eliminate the effect of the phase fluctuations between the windows, the powerizing is carried out, followed by further averaging between the windows, thereby producing a result with higher reliability.

In the example as shown in FIG. 5, the averaging window range N and the moving step M of the averaging windows are both three slots. Placing N=M can reduce the buffer size needed for the in-phase averaging of the mobile station. Thus, although the example of FIG. 4 requires the buffer size of three slots for the in-phase averaging, the example of FIG. 5 requires the buffer size of only one slot.

Figure 6:
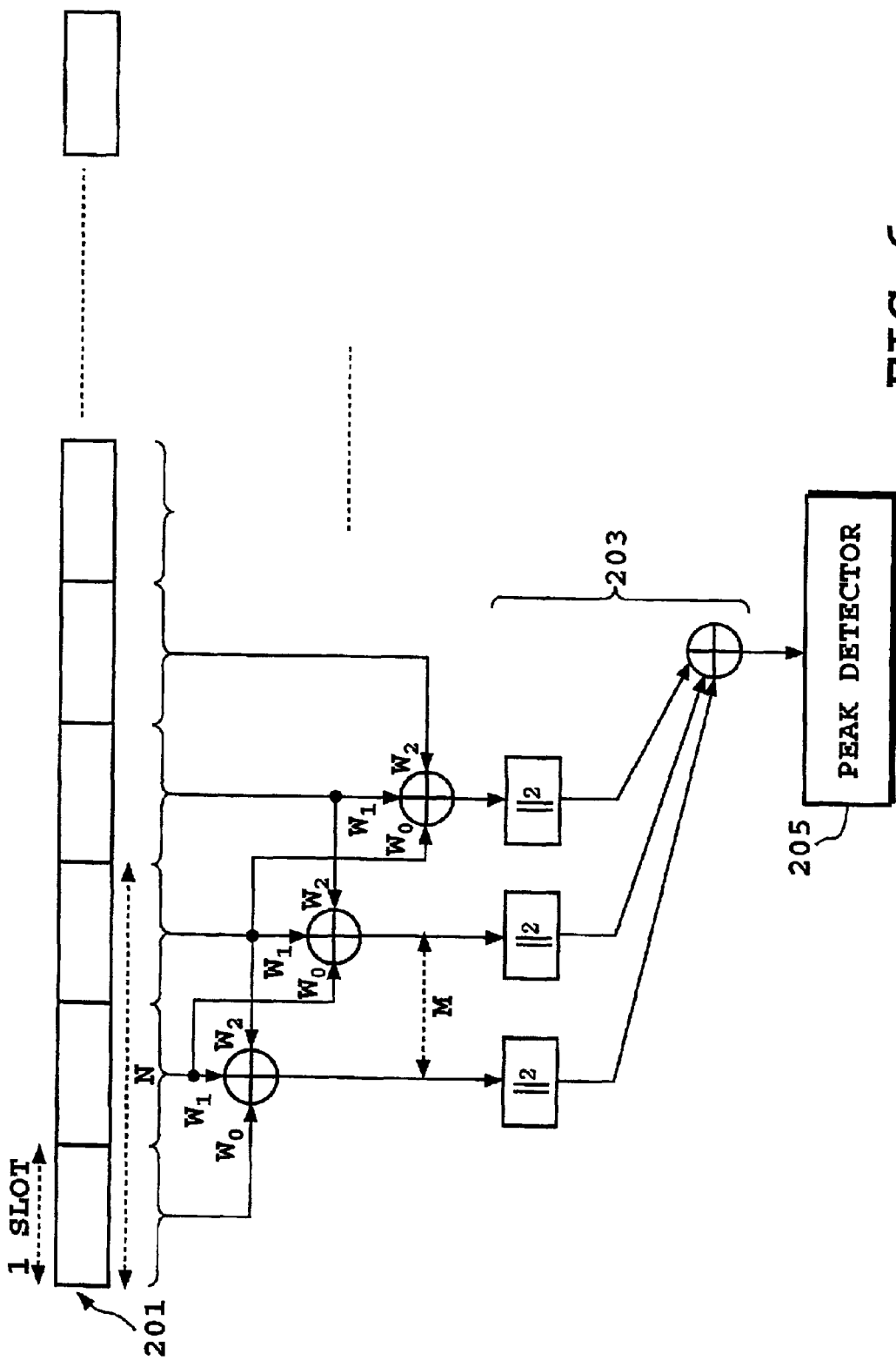
FIG. 6 is a diagram showing a method of carrying out the in-phase averaging with assigning weights within the averaging windows in the example as shown in FIG. 4.

FIG. 6 shows an example of carrying out the in-phase averaging with assigning weights within each averaging window in the in-phase averaging utilizing averaging windows as shown in FIG. 4. Here, $w_0$, $w_1$ and $w_2$ designate weight factors of the averaging. Decreasing the weight factors toward the ends of each averaging window can reduce the effect of the phase fluctuations of the correlation values due to fading.

Figure 7:
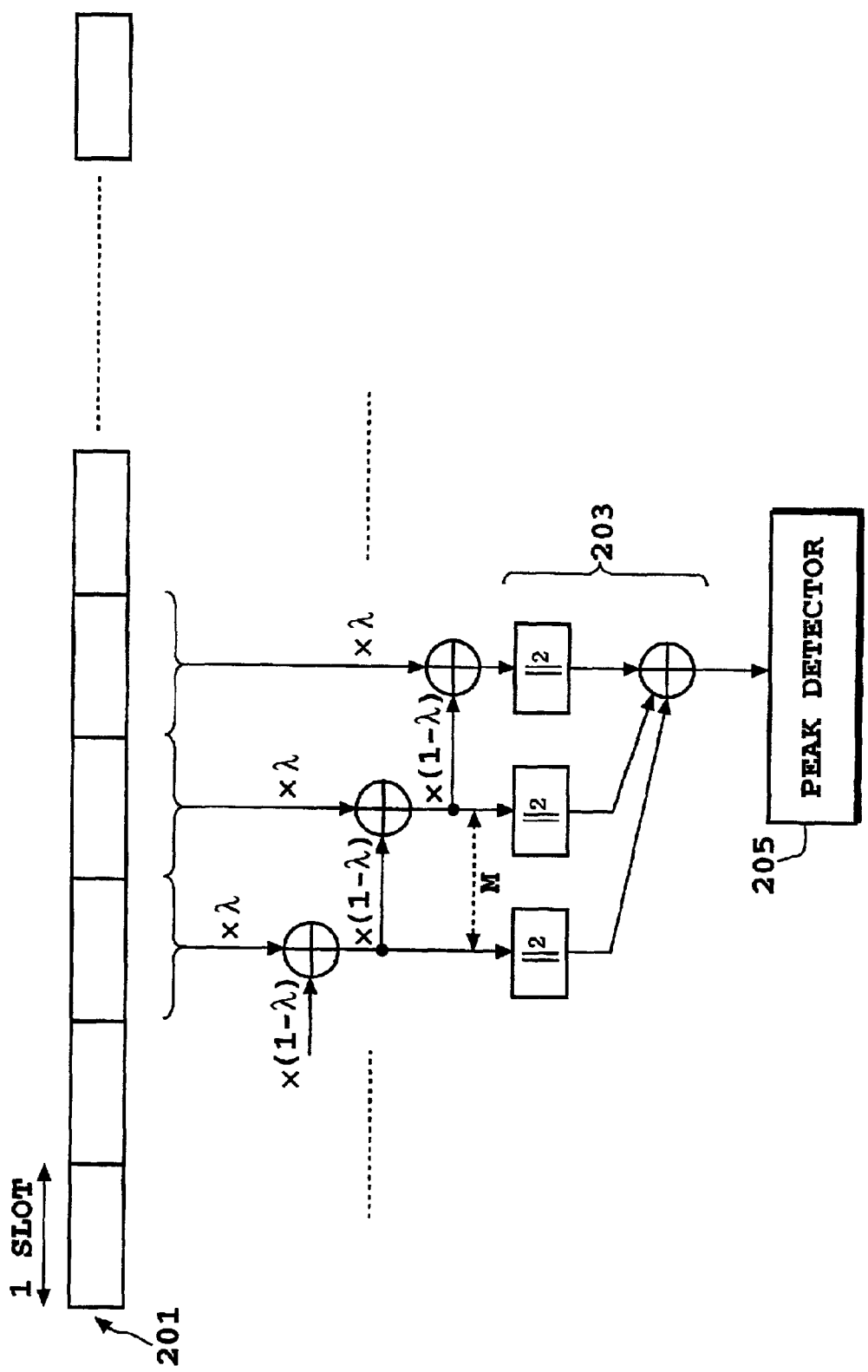
FIG. 7 is a diagram showing exponential weighting in-phase averaging in an embodiment in accordance with the present invention.

FIG. 7 shows an example of exponential weighting in-phase averaging. Here, $\lambda$ is a weight factor taking a value between zero and one. As the $\lambda$ increases, the averaging period becomes shorter. On the contrary, as the $\lambda$ decreases, the averaging period is increased because the number of the past correlation values to be considered is increased in this case. In the exponential weighting in-phase averaging, the number of buffers required for the in-phase averaging is only one. In the example of FIG. 7, the power averaging after the in-phase averaging is carried out at every M=1 slot interval. As the M is increased, the averaging effect will become smaller. However, since the amount of the calculation can be reduced in this case, the M can be increased when the calculation amount must be reduced because of hardware management.

Figure 8:
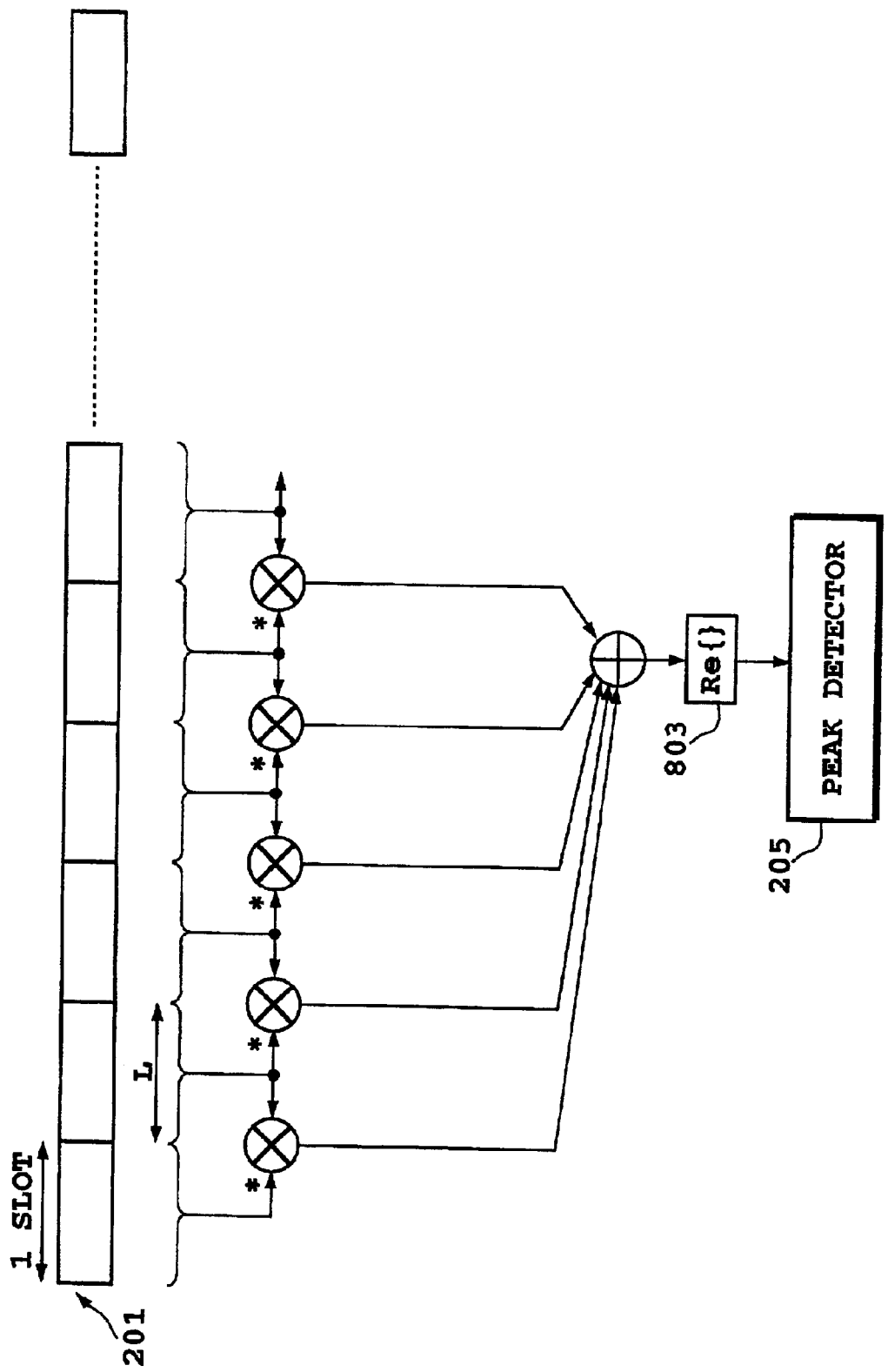
FIG. 8 is a diagram showing differentially coherent detection type in-phase averaging in an embodiment in accordance with the present invention.
Figure 9:
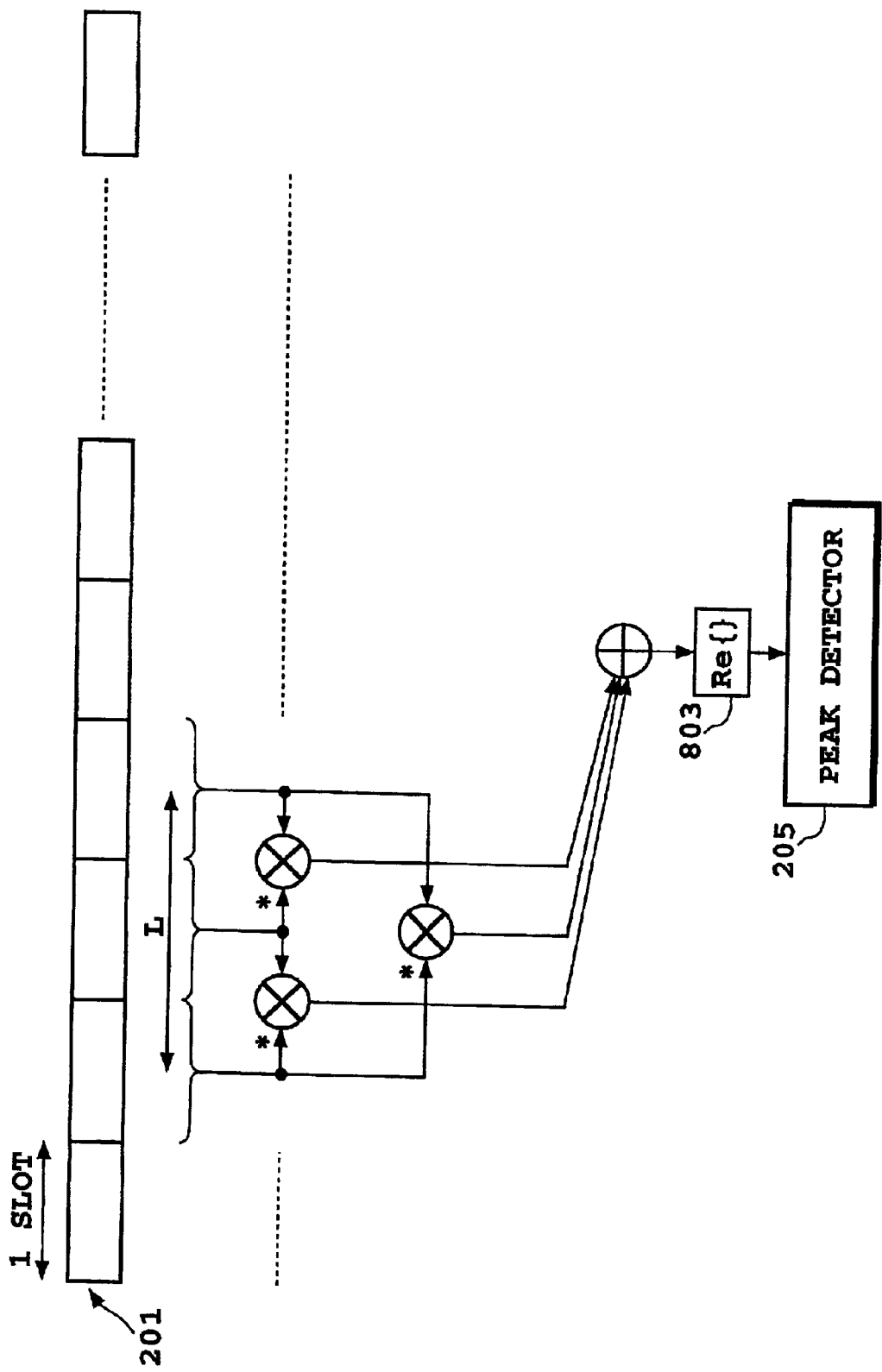
FIG. 9 is a diagram showing differentially coherent detection type in-phase averaging in an embodiment in accordance with the present invention.

FIGS. 8 and 9 each show an example of differentially coherent detection type in-phase averaging. In the differentially coherent detection type in-phase averaging, the phase of the correlation value in a given slot is corrected using the correlation values of previous L slots as a reference signal (returning the phases to zero). Such phase correction can align the phases of the correlation values. Averaging these values in the complex numbers, and powerizing the result (that is, extracting the real part of the result) by an operator 803 make it possible to carry out highly reliable correlation detection. In the example of FIG. 8, the differentially coherent detection type in-phase averaging is performed at L=1, and in that of FIG. 9, it is carried out at L=2.

Figure 10:
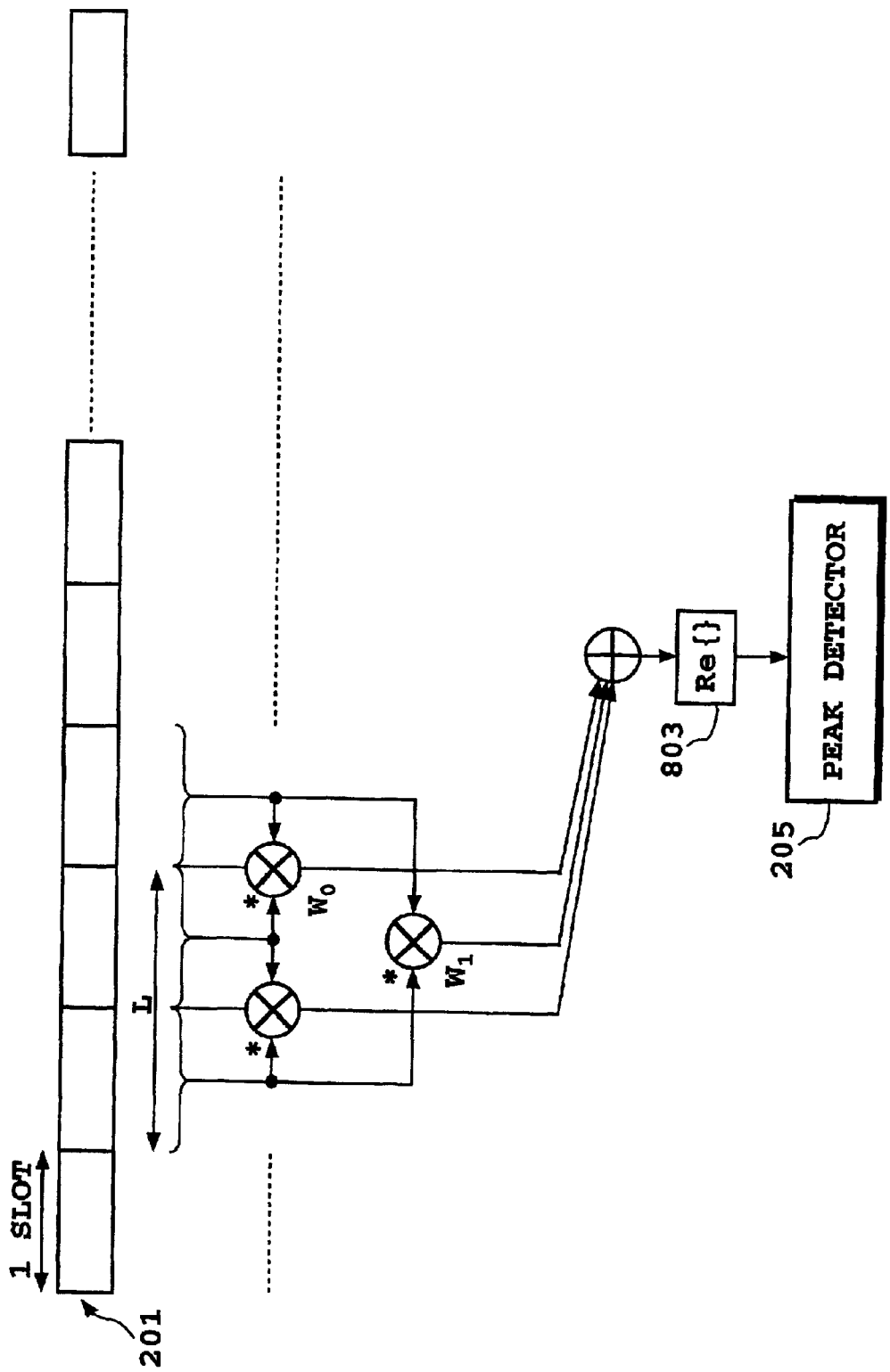
FIG. 10 is a diagram showing differentially coherent detection type in-phase averaging with assigning weights in an embodiment in accordance with the present invention.

FIG. 10 shows a method of assigning weights in the differentially coherent detection type in-phase averaging as shown in FIG. 9. As the L increases (that is, the time difference from the reference signal is large), the effect of the phase fluctuations of the correlation values due to fading can be reduced by decreasing the weight factors.

Figure 11:
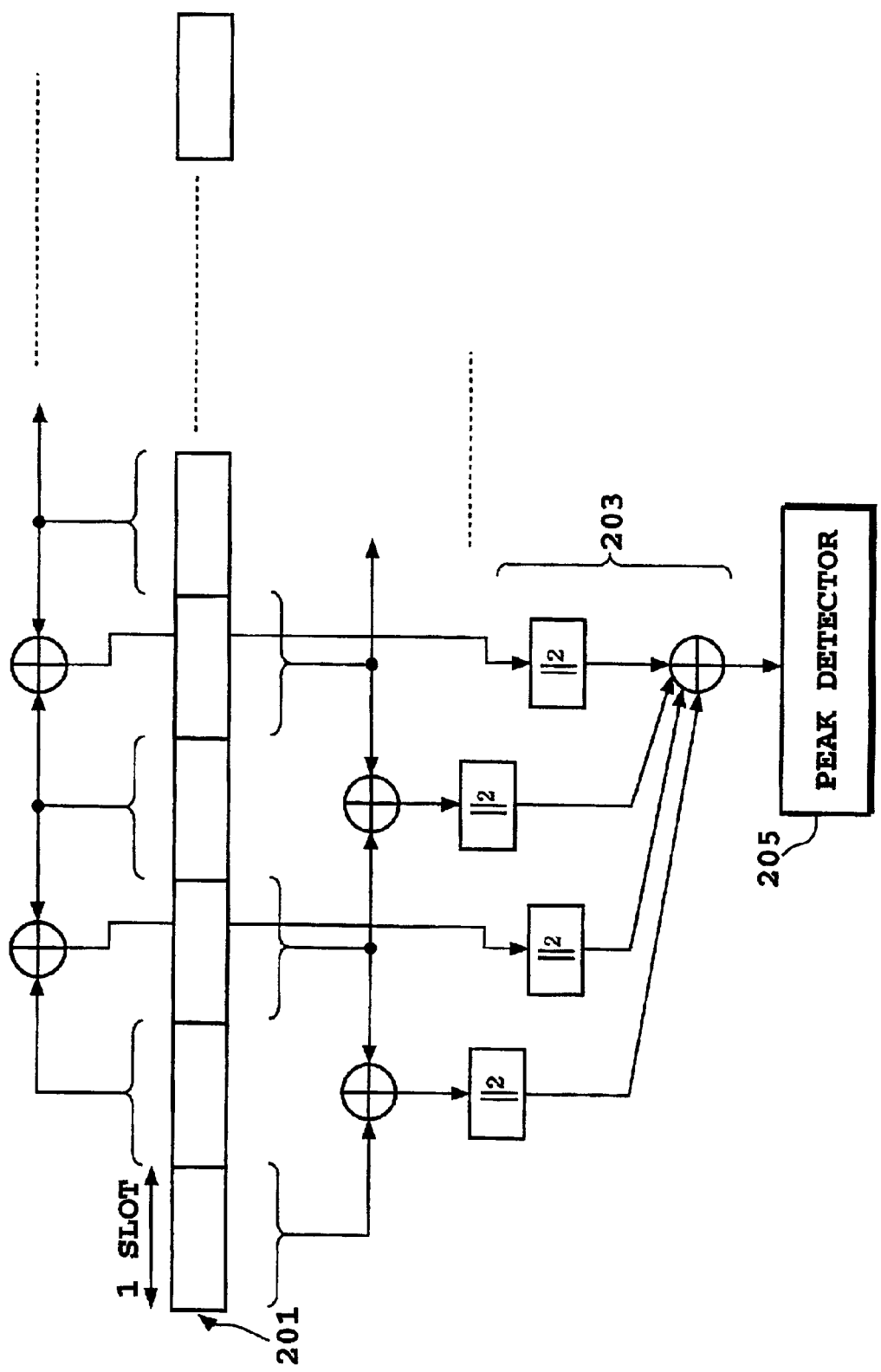

FIG. 11 shows an example of the in-phase averaging utilizing corresponding averaging windows, when TSTD is applied to the SCH, that is, when TSTD-ON. The mobile station has buffers for signals sent from respective antennas of a base station, and carries out in-phase averaging of the correlation values of the SCH that is assumed to be sent from the same antenna. In other words, the in-phase averaging is carried out every other slot. By preparing the buffers for respective antennas, the mobile station can carry out the in-phase averaging every other slot not only when using the averaging windows, but also when performing the exponential weighting in-phase averaging or differentially coherent detection type in-phase averaging.

The mobile station may recognize whether the TSTD is applied to the mobile communication system or not. In the mobile communication system in which each base station can select the application of the TSTD, the mobile station cannot recognize whether the TSTD is applied or not at least when the mobile station is turned on. When TSTD-OFF/ON is unknown, the mobile station can carry out one of the following three methods as the synchronization establishment operation.

Figure 12:
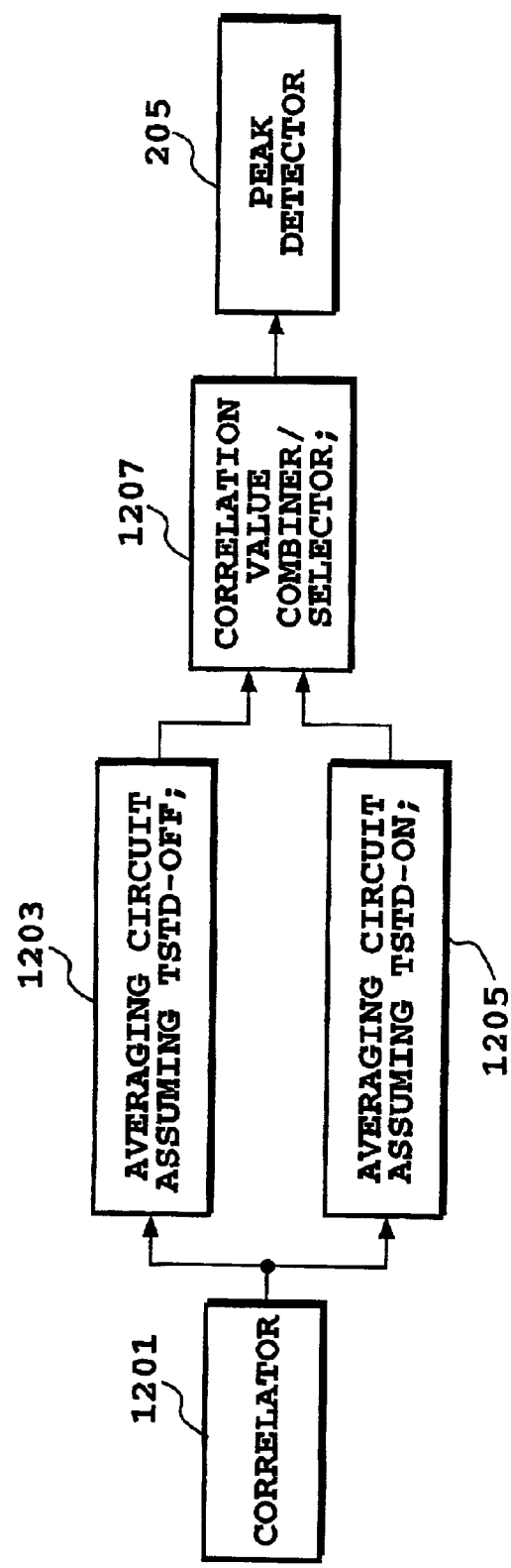
FIG. 12 is a block diagram showing a method of averaging carried out by assuming both TSTD-OFF and TSTD-ON when TSTD-OFF/ON is unknown.

A first method assumes both TSTD-OFF and TSTD-ON, and combines or selects the averaging results of the two corresponding methods. FIG. 12 shows an example of a system for implementing the synchronization establishing method according to the first method. In the example as shown in FIG. 12, an averaging circuit 1203 assuming the TSTD-OFF and an averaging circuit 1205 assuming the TSTD-ON are connected to a correlator 1201, and the correlation output is produced by combining or selection using a correlation value combiner/selector 1207.

The combining of the correlation values can be achieved by assigning predetermined weights to the outputs of the two averaging circuits, followed by summing them up. On the other hand, the selection of the correlation values can be achieved by assigning predetermined weights to maximum correlation values obtained by the two averaging methods, followed by comparing them, and by selecting the output result of the averaging circuit that will provide a greater correlation value.

Figure 13:
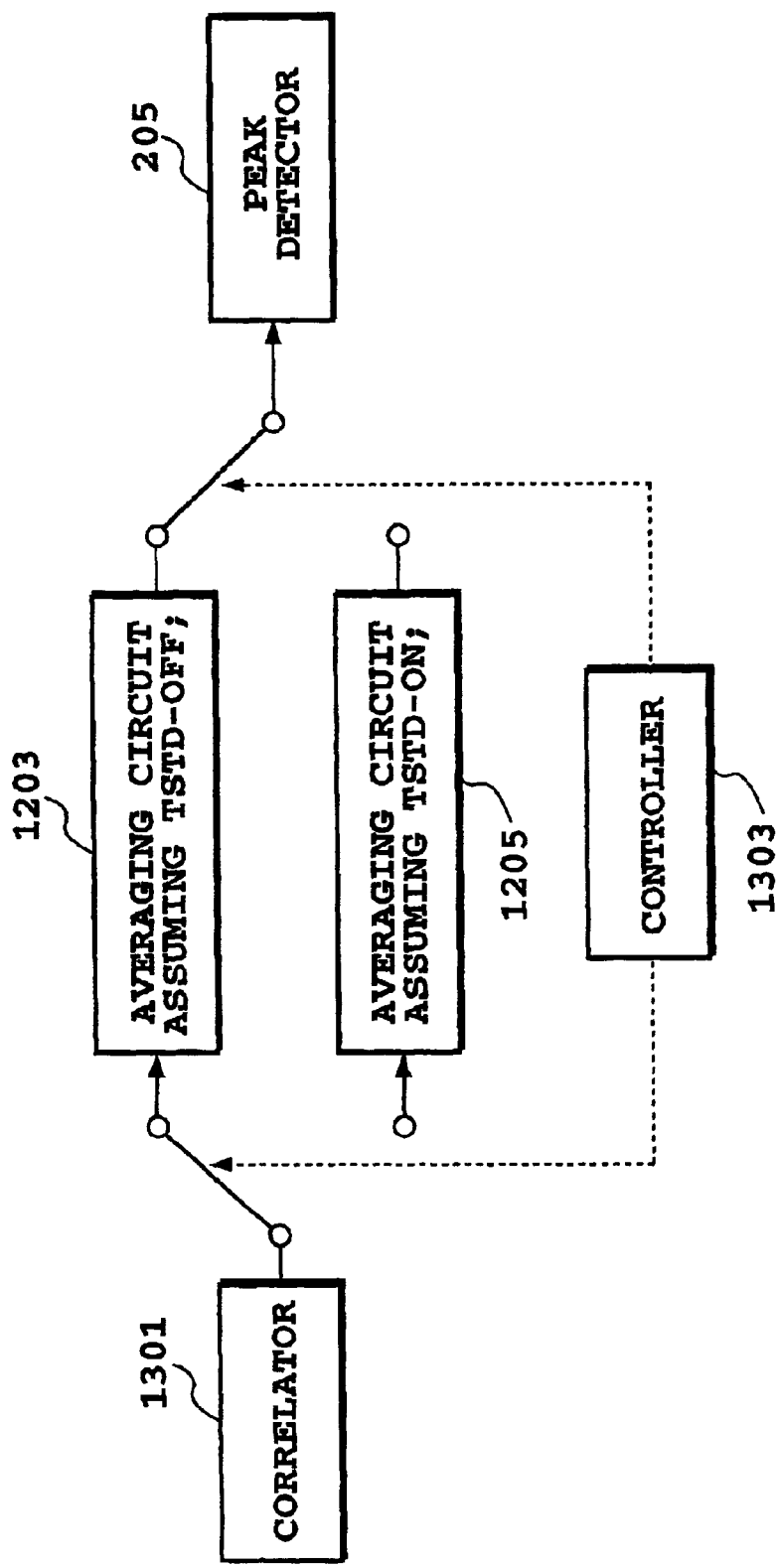

A second method switches between an averaging method assuming the TSTD-OFF and an averaging method assuming the TSTD-ON. FIG. 13 shows a system for implementing the second synchronization establishing method. In FIG. 13, the reference numeral 1303 designates a controller for controlling the selection of one of the averaging circuits by switching the connection between a correlator 1301 and the two averaging circuits. As a switching control method, there is a switching method of the averaging circuits according to the number of selections of the averaging circuits. For example, when the number of trials of the synchronization establishment is odd, the averaging by the averaging circuit 1203 assuming the TSTD-OFF is carried out, whereas when it is even, the averaging by the averaging circuit 1205 assuming the TSTD-ON is carried out so as to obtain an averaged result. Alternatively, in the first to Nth trial of the synchronization establishment, the averaging assuming the TSTD-OFF is carried out, and if the synchronization is not established up to the end of the N consecutive trials, a decision is made that TSTD-ON. Thus, the averaging assuming the TSTD-ON is carried out from the (N+1)th trial onward, enabling the method to try the TSTD-OFF in-phase averaging with higher effect, first.

Figure 14:
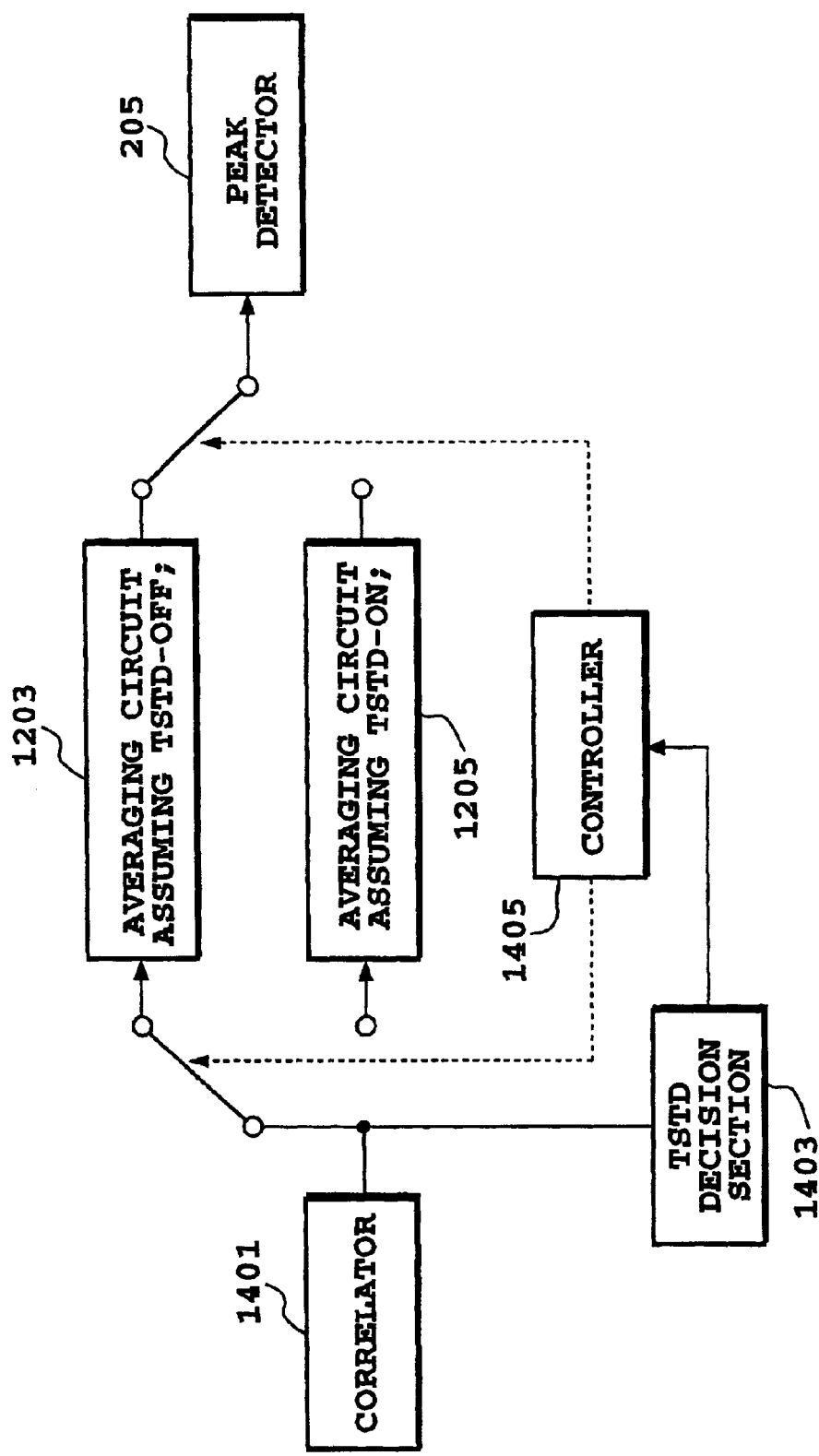

A third method comprises a TSTD decision section 1403 for deciding the TSTD-OFF/ON between a correlator 1401 and a controller 1405 as shown in FIG. 14, makes a TSTD-OFF/ON decision before the averaging, and carries out switching of the averaging method in response to the decision result.

The controller 1405 decides as to which one of the averaging circuits is to be used according to the decision result of the TSTD decision section 1403. As the TSTD-OFF/ON decision method, such a method can be adopted that calculates correlation between correlation values of adjacent slots, makes a decision as the TSTD-ON when the correlation value is larger than a predetermined value, and as the TSTD-OFF when the correlation value is smaller. Alternatively, there is a method in which the visited location cell notifies the TSTD decision section 1403 of the TSTD-OFF/ON by means of a control signal or the like when the mobile station is in the idle state or traffic state.

In the in-phase averaging, as the number of the averaging period increases, that is, as the number of slots used for the averaging increases, the averaging effect of the noise and interference will be improved in general. However, since the phase of the signal fluctuates momentarily because of fading or the like on the propagation path of the mobile communication, too long an averaging period can deteriorate the peak detection characteristic because of the phase fluctuations. Thus, there is an optimum averaging period depending on the state of the propagation path, the moving speed of the mobile station, etc. Accordingly, it is important to set an appropriate averaging period. The following two methods can be conceived as a method of setting the averaging period in the in-phase averaging.

Figure 15:
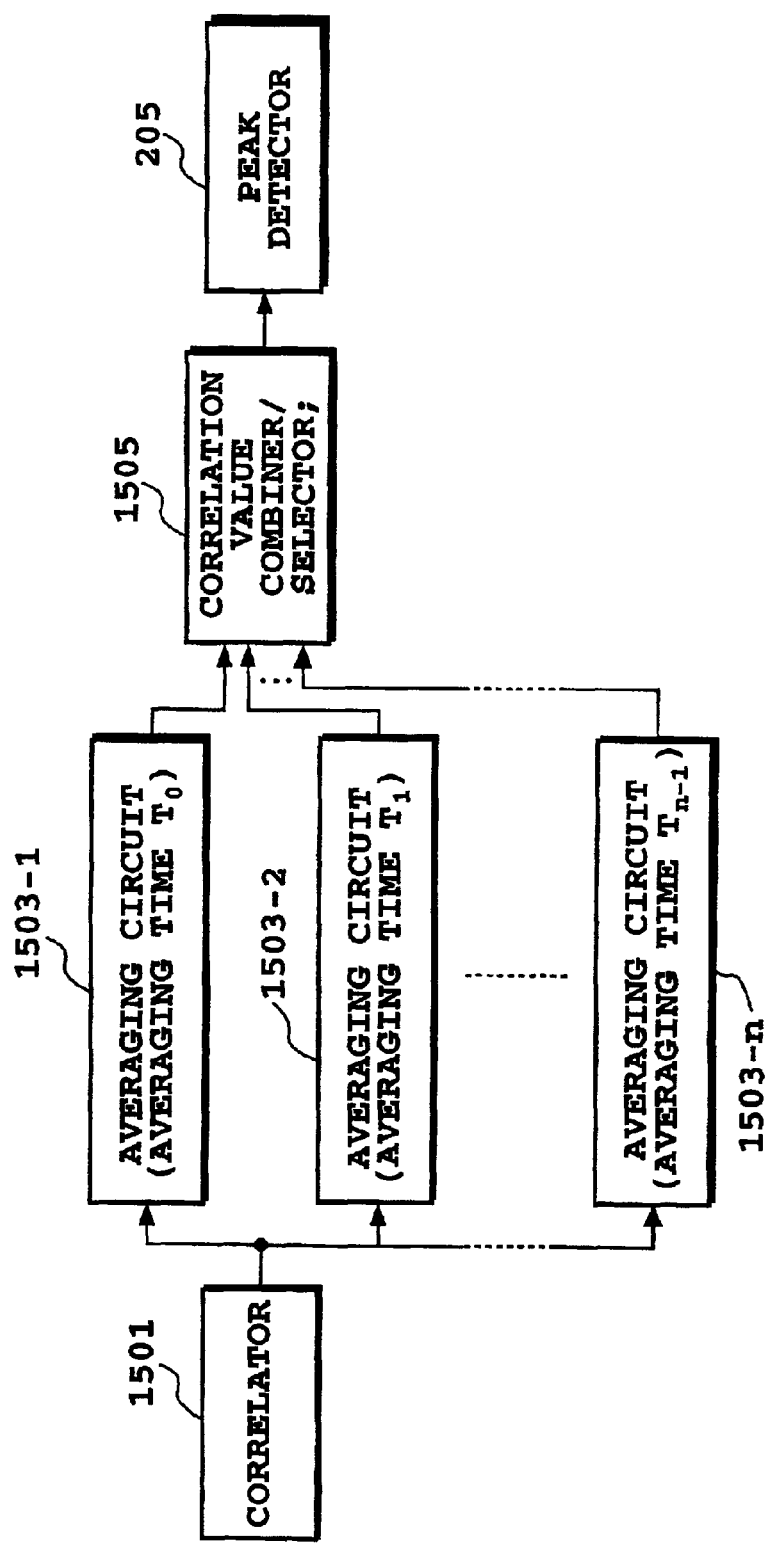
FIG. 15 is a block diagram showing a method that carries averaging in a plurality of averaging periods, and combines or selects the results.

A first method carries out n ways of averaging of the output of the correlator 1501 over n different averaging periods $T_0$–$T_{n-1}$ using n averaging circuits 1503-1–1503-$n$ as illustrated in FIG. 15, and combines or selects the results by a correlation value combiner/selector 1505 to supply the peak detection circuit 205 with the result. As a combining method, a method can be adopted that assigns weights to the outputs of the averaging circuits 1503 at respective timings, followed by summing them up. As a selection method, there is a method that assigns weights to maximum correlation values of the averaging circuits 1503-1–1503-n, followed by comparing them and selecting the output of the averaging circuit that gives the maximum correlation value as the result of the comparison.

Figure 16:
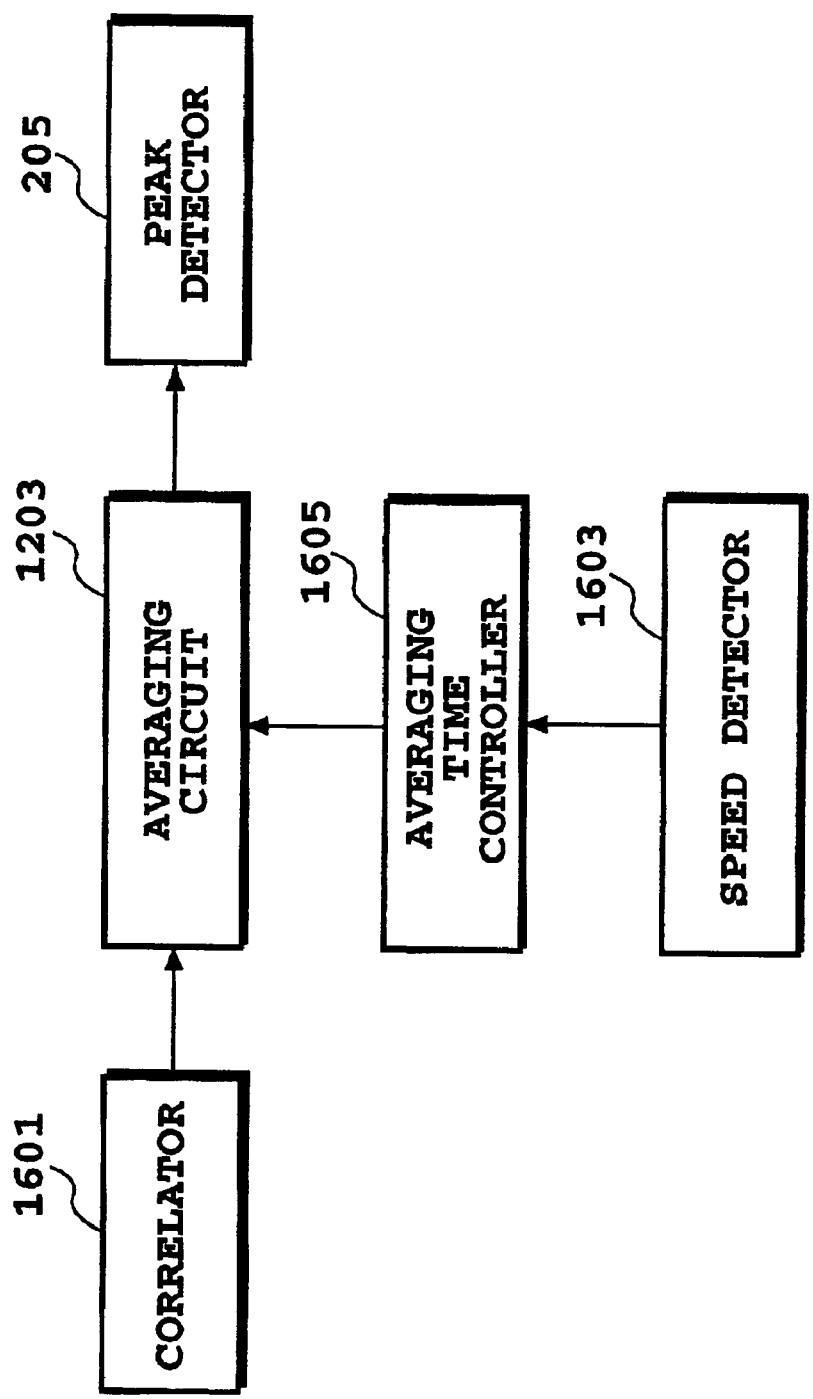
FIG. 16 is a block diagram showing a method of adaptively varying the averaging periods.

A second method adaptively varies the averaging period over which the output of the correlator 1601 is averaged. More specifically, it detects the speed of the mobile station by a speed detector 1603 as shown in FIG. 16. In response to the detection result, it controls the averaging period by an averaging period controller 1605 of the averaging circuit 1203.

The state of the mobile station carrying out the synchronization establishment can be roughly divided into three states: a power up state, an idle state, and a traffic state. These states will vary conditions involved in the synchronization establishing operation such as the intensity of the received signal and the magnitude of the frequency drift at the base station with which the mobile station tries to establish synchronization. Therefore, selecting the appropriate synchronization establishing method depending on the state, the mobile station can achieve the synchronization establishment at higher reliability, in a shorter time. Thus, it is generally effective to control the averaging period of the in-phase averaging according to the states.

In addition, at power up, it is usually difficult for the mobile station to carry out the in-phase averaging because it receives no signal from the base station, and its frequency stability is generally low. In such a case, it is effective for the mobile station to take power average during power up, and to carry out in-phase averaging in the idle state or traffic state. Even during the idle state, the frequency stability of the mobile station can be low because of the power saving. In such a case, it is preferable for mobile station to use power average during the power up and idle state, and to carry out the in-phase averaging only in the traffic state. Furthermore, since the mobile station tries to establish synchronization with a signal sent from a base station other than the base station in the traffic state in the synchronization establishing operation during the traffic state, the signal from the base station in the traffic state becomes interference, and hence the S/N becomes small of the signal from the base station with which the mobile station tries to establish synchronization. Therefore, it is effective for the mobile station to employ the in-phase averaging only during the traffic state, and to use the rather simple power averaging method during the power up and idle state considering to simplify hardware configuration of the mobile station or to promote the power saving.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number within an averaging window over a plurality of periods of the synchronization channel, and of outputting first averaged correlation values;

a powerizing step of powerizing the first averaged correlation values individually, and of outputting first powerized correlation values;

a step of averaging the first powerized correlation values, and of outputting first power averaged correlation values; and a peak detecting step of detecting a peak of the first powerized correlation values output.

2. The synchronization establishing method as claimed in claim 1, wherein a number of periods of the first correlation values, over which the averaging is carried out in the averaging window, is equal to a moving unit of the averaging window.

3. The synchronization establishing method as claimed in claim 1, wherein the step of averaging first correlation values assigns weights at every period of the first correlation values in the averaging window.

4. The synchronization establishing method as claimed in claim 1, wherein the step of averaging first correlation values carries out averaging using an exponential weighting averaging method.

5. The synchronization establishing method as claimed in claim 1, wherein the step of averaging first correlation values makes phase correction of one of the first correlation values by using the first correlation values in a period previous to the period of the one of the first correlation values.

6. The synchronization establishing method as claimed in claim 5, wherein the step of averaging first correlation values assigns weights to every period of the first correlation values to which the phase correction is applied.

7. The synchronization establishing method as claimed in claim 5, wherein the powerizing step outputs real parts of the first correlation values to which the phase correction is applied.

8. The synchronization establishing method as claimed in claim 1, wherein the step of averaging first correlation values carries out the averaging over a plurality of first averaging periods that are different from each other, and the powerizing step selects a maximum value from the plurality of powerized correlation values.

9. The synchronization establishing method as claimed in claim 1, wherein the step of averaging first correlation values carries out the averaging over a second averaging period that adaptively varies.

10. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number over a plurality of periods of the synchronization channel, and of outputting first averaged correlation values;

a powerizing step of powerizing the first averaged correlation values individually, and of outputting first powerized correlation values; and a peak detecting step of detecting a peak of the first powerized correlation values output, wherein when the synchronization channel is estimated to be transmitted alternately from two antennas, the averaging step averages second correlation values that are estimated to be transmitted from a same antenna, and outputs second averaged correlation values; and the powerizing step detects power of the second averaged correlation values to output second powerized correlation values.

11. The synchronization establishing method as claimed in claim 10, wherein the averaging step averages the first correlation values and the second correlation values separately, and the powerizing step detects power of the first averaged correlation values and power of the second averaged correlation values, and selects one of two sets of the first powerized correlation values and the second powerized correlation values.

12. The synchronization establishing method as claimed in claim 11, wherein the powerizing step assigns weights to a maximum value of the first powerized correlation values and to a maximum of the second powerized correlation values, and selects the powerized correlation values that will give a greater maximum value.

13. The synchronization establishing method as claimed in claim 11, wherein the powerizing step selects one of two sets of the first powerized correlation values and the second powerized correlation values such that the selected one differs from the powerized correlation values selected previously.

14. The synchronization establishing method as claimed in claim 13, wherein the powerizing step makes a decision as to which one of two sets of the first powerized correlation values and the second powerized correlation values is to be selected in accordance with a number of times the two sets of the powerized correlation values are selected.

15. The synchronization establishing method as claimed in claim 13, wherein the powerizing step successively selects one of two sets of the first powerized correlation values and the second powerized correlation values by a predetermined number of times, and when synchronization is not established, it selects the other set of the powerized correlation values.

16. The synchronization establishing method as claimed in claim 10, wherein the averaging step averages the first correlation values and the second correlation values separately, and the powerizing step detects power of the first averaged correlation values and power of the second averaged correlation values, and assigns weights to the first powerized correlation values and the second powerized correlation values at individual timings, followed by summing them up, respectively.

17. The synchronization establishing method as claimed in claim 10, further comprising a step of selecting the correlation values to be averaged, wherein the averaging step averages one of two sets of the first correlation values and the second correlation values selected.

18. The synchronization establishing method as claimed in claim 17, wherein the step of selecting calculates correlation between correlation values in a given period to be averaged and correlation values in a period adjacent to the given period.

19. The synchronization establishing method as claimed in claim 17, wherein the step of selecting selects the correlation values to be averaged in response to a control signal transmitted from the base station.

20. The synchronization establishing method as claimed in claim 17, wherein the averaging step carries out the averaging over a plurality of first averaging periods that are different from each other, and the powerizing step assigns weights to the plurality of powerized correlation values at individual timings, followed by summing them up.

21. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number over a plurality of periods of the synchronization channel, and of outputting first averaged correlation values;

a powerizing step of powerizing the first averaged correlation values individually, and of outputting a first powerized correlation values; and a peak detecting step of detecting a peak of the first powerized correlation values output, wherein the averaging step carries out the averaging over an averaging period that adaptively varies, and wherein the averaging period is varied in response to a moving speed of the mobile station.

22. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number over a plurality of periods of the synchronization channel, and of outputting first averaged correlation values;

a powerizing step of powerizing the first averaged correlation values individually, and of outputting first powerized correlation values; and a peak detecting step of detecting a peak of the first powerized correlation values output, wherein the averaging step carries out the averaging over an averaging period that is varied depending on a state of the mobile station, which includes a power up state, an idle state and a traffic state of the mobile station.

23. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number over a plurality of periods of the synchronization channel, and of outputting first averaged correlation values;

a powerizing step of powerizing the first averaged correlation values individually, and of outputting first powerized correlation values;

a peak detecting step of detecting a peak of the first powerized correlation values output; and outputting, when the mobile station is at power up, power averaged correlation values by detecting powers of the correlation values of the synchronization channel first, and by averaging the powers thereafter, wherein the peak detecting step detects a peak of the power averaged correlation values.

24. The synchronization establishing method as claimed in claim 23, wherein the averaging step carries out the averaging over an averaging period that varies depending on the idle state and the traffic state of the mobile station.

25. A synchronization establishing method of a mobile station in a mobile communication system, in which a synchronization channel is periodically sent in a downlink signal so that the mobile station, which detects the downlink signal sent from a base station, can establish synchronization to the downlink signal, said synchronization establishing method comprising:

an averaging step of averaging first correlation values in phase in complex number over a plurality of periods of the synchronization channel, and of outputting first averaged correlation values;

a powerizing step of powerizing the first averaged correlation values individually, and of outputting first powerized correlation values;

a peak detecting step of detecting a peak of the first powerized correlation values output; and outputting, when the mobile station is in one of the power up and idle state, power averaged correlation values by detecting powers of the correlation values of the synchronization channel first, and by averaging the powers thereafter, wherein the peak detecting step detects a peak of the power averaged correlation values.

* * * * *

UNITED STATES PATENT AND TRADEMARK OFFICE
CERTIFICATE OF CORRECTION

PATENT NO.         : 6,950,455 B2
APPLICATION NO. : 09/880453
DATED              : September 27, 2005
INVENTOR(S)        : Tanno et al.

It is certified that error appears in the above-identified patent and that said Letters Patent is hereby corrected as shown below:

Column 2
Line 18, before "control", insert --the--

Column 6
Line 43, change "number" to --numbers--

Column 8
Line 28, change "effect, first" to --effect first--

Column 9
Line 14, before "controller", change "period" to --time--

Signed and Sealed this

Third Day of July, 2007

JON W. DUDAS
*Director of the United States Patent and Trademark Office*